United States Patent
Muthuswamy et al.

(10) Patent No.: US 6,743,543 B2
(45) Date of Patent: *Jun. 1, 2004

(54) FUEL CELL USING VARIABLE POROSITY GAS DIFFUSION MATERIAL

(75) Inventors: Sivakumar Muthuswamy, Plantation, FL (US); Steven D. Pratt, Plantation, FL (US); Ronald J. Kelley, Coral Springs, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/999,124

(22) Filed: Oct. 31, 2001

(65) Prior Publication Data

US 2003/0082435 A1 May 1, 2003

(51) Int. Cl.[7] .............................. H01M 4/86; H01M 8/10
(52) U.S. Cl. ........................ 429/40; 429/24; 429/42; 429/44
(58) Field of Search .......................... 429/24, 40, 42, 429/44

(56) References Cited

U.S. PATENT DOCUMENTS

| | | | |
|---|---|---|---|
| 5,858,567 A | | 1/1999 | Spear, Jr. et al. |
| 5,998,058 A | * | 12/1999 | Fredley ........................ 429/44 |
| 6,106,965 A | * | 8/2000 | Hirano et al. .................. 429/30 |
| 6,156,184 A | | 12/2000 | Antonucci et al. |
| 6,207,312 B1 | | 3/2001 | Wynne et al. |
| 2002/0182464 A1 | * | 12/2002 | Kim et al. ..................... 429/24 |

FOREIGN PATENT DOCUMENTS

JP 6-267555 * 9/1994

* cited by examiner

*Primary Examiner*—Bruce F. Bell
*Assistant Examiner*—Jonathan Crepeau
(74) *Attorney, Agent, or Firm*—Randi L. Karpinia

(57) ABSTRACT

A fuel cell (100) includes a membrane electrode assembly (110) located together with a layer of variable porosity porous gas diffusion material (150). The variable porosity gas diffusion material layer (150) operates to selectively limit the amount of reactants reaching localized areas of the membrane electrode assembly (110) in order to reduce hot spots.

5 Claims, 3 Drawing Sheets

FUEL CELL USING VARIABLE POROSITY GAS DIFFUSION MATERIAL

TECHNICAL FIELD

This invention relates in general to fuel cells, and more particularly to a system for controlling hot spots that tend to occur on fuel cell membrane electrode assemblies.

BACKGROUND

In recent years, nearly all electronic devices have been reduced in size and made lightweight, in particular portable electronic devices. This advancement has been made possible, in part, by the development of new battery chemistries such as nickel-metal hydride, lithium ion, zinc-air, and lithium polymer that enable larger amounts of power to be packaged in a smaller container. These secondary or rechargeable batteries need to be recharged upon depletion of their electrical capacity. This is typically performed by connecting the battery to a battery charger that converts alternating current to a low level direct current of 2–12 volts. The charging cycle typically lasts a minimum of 1–2 hours, and more commonly 4–14 hours. Although the new batteries are a tremendous advancement over the previous generations of batteries, they still suffer from the need for sophisticated charging regimens and the slow charging rates.

Fuel cells are expected to be the next major source of energy for portable electronic products. Simply put, fuel cells catalytically convert a hydrogen molecule to hydrogen ions and electrons, and then extract the electrons through a membrane as electrical power, while oxidizing the hydrogen ions to $H_2O$ and extracting the byproduct water. The tremendous advantage of fuel cells is the potential ability to provide significantly larger amounts of power in a small package, as compared to a battery. Their potential ability to provide long talk-times and standby times in portable electronic device applications are driving miniaturization of fuel cell technologies. The polymer electrolyte membrane (PEM) based air-breathing, dead-ended fuel cells are ideally suited for powering portable communication devices. One of the key operating challenges in a small dead-ended fuel cell system is temperature regulation at different points on the cells. Since these fuel cells do not have forced gas circulation or external membrane water management systems, the distribution of fuel gas and water over different areas of the membrane electrode assembly (MEA) of the fuel cell will be non-uniform. This non-uniform distribution has the potential to create significant hot spots which can destroy the MEA and hence the performance of the fuel cell.

In a dead-ended air-breathing hydrogen/air fuel cell, the electrolyte membrane would have a tendency to dehydrate when it is operated at a relatively high current. As the membrane dries, the internal resistance of the cell increases, and the power output of the cell is substantially reduced. Undesirably, this drying out can progressively march across the PEM until the fuel cell fails completely. The increase in internal resistance produces $I^2R$ heating which develops into "hot spots". Though prior art technologies exist to control some sources of hot spots, there is no practical prior art technique that will significantly eliminate the probability of encountering hot spot conditions. In addition, the prior art methods use active systems, that require external components, which are not practical for a portable fuel cell based power source. Most of the prior art methods focus on membrane hydration and water management methods to prevent the creation of hot spots. For example, U.S. Pat. Nos. 5,858,567, 6,156,184, and 6,207,312 teach various techniques for membrane hydration. These methods are based on an approach which attempts to keep the entire electrolyte membrane hydrated at high enough level to survive the highest level of current density without drying out the membrane. In addition, hot spots can be caused by factors other than electrolyte membrane dehydration such as poor distribution of fuel gases. The prior art methods are cumbersome and are not fail-proof; they can fail for a variety of reasons including non-uniformity of membrane material, aging of the materials and localized variations in concentration of fuel gas. In addition, maintaining a high level of hydration to keep the entire electrolyte membrane fully hydrated can cause flooding on the cathode side of the fuel cell. Therefore, a better approach is needed for controlling hot spots in fuel cell systems.

DETAILED DESCRIPTION OF THE PREFERRED EMBODIMENT

Figure 1:
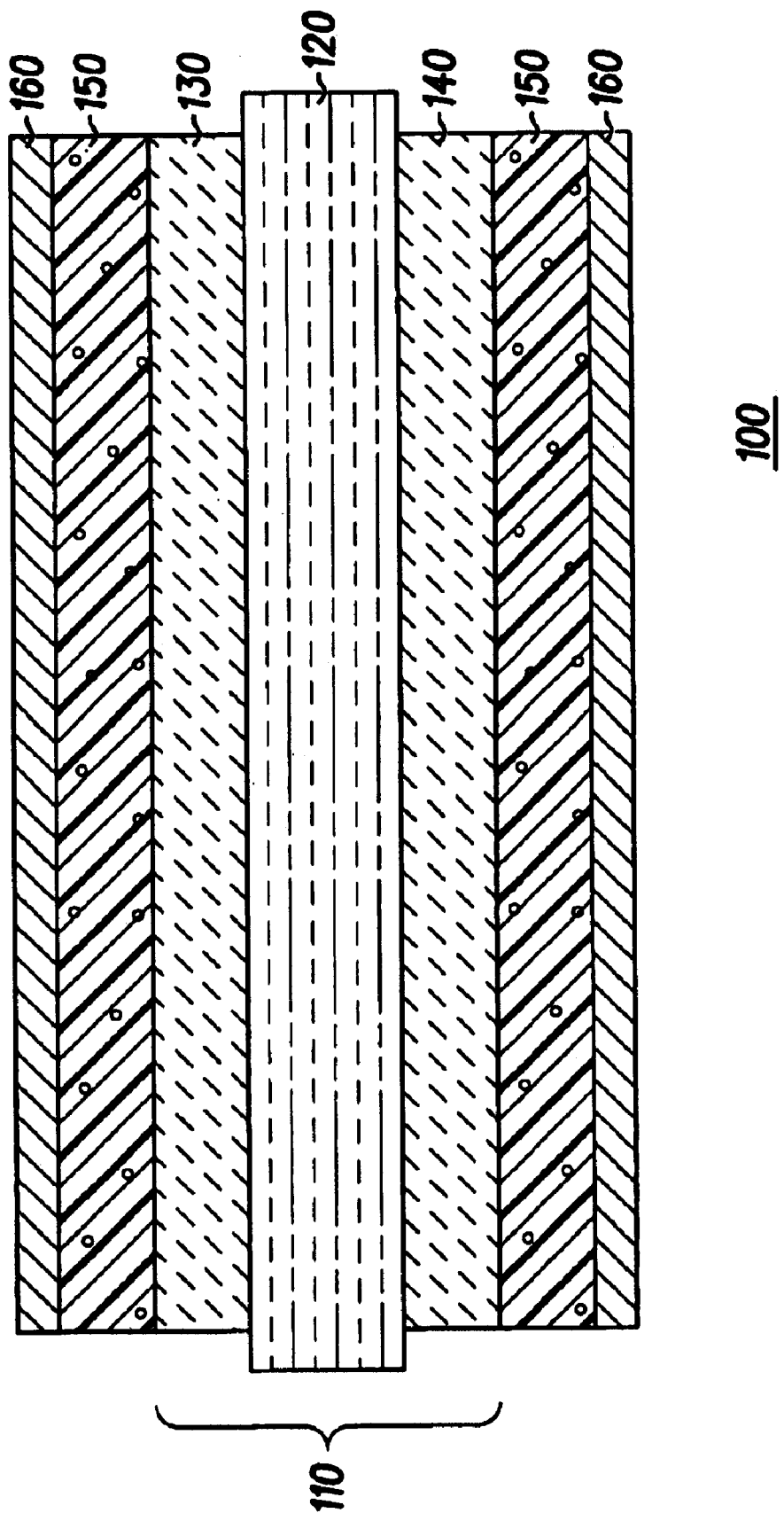
FIG. 1 illustrates a fuel cell according to a first embodiment of the present invention.

A method and apparatus for passively controlling creation and growth of hot spots in a fuel cell is disclosed. A typical fuel cell based power source has many unit fuel cells that are connected to each other in series. Each of the fuel cells has a membrane electrode assembly which consists of an electrolyte layer, a cathode and an anode disposed on either side of the electrolyte layer. The fuel cell also has a gas diffusion layer (GDL) and a current collector on each side of the MEA. The current collector gathers the free electrons produced during the electrochemical reaction. In a dead-ended air-breathing hydrogen/air fuel cell, the electrolyte membrane would have a tendency to dehydrate when it is operated at a relatively high current. As the membrane dries, the internal resistance of the cell increases, increasing $I^2R$ heating which develops into "hot spots". Hot spots can also be caused by poor distribution of fuel gases, high concentration of fuel gas at localized areas, runaway reaction at some areas of the MEA and localized shorting of the cell. One way to avoid progressive degradation from hot spot initiation to a complete failure of the MEA is to reduce the reaction rate at the hot spot areas so that very little heat is generated in those areas. This will eliminate $I^2R$ heating in that area and allow that area to recover and rehydrate.

A method of operating a fuel cell, having a membrane electrode assembly, involves selectively limiting the amount of reactants reaching localized areas of the MEA surface. Selective limiting of the amount of reactants reaching localized areas of the MEA is realized by a layer of variable porosity (VP) gas diffusion material located together with the membrane electrode assembly. The porosity of the VP gas diffusion material at localized areas on the VP gas diffusion material layer changes from a high value to a low value in response to a trigger condition, on the MEA side adjacent to the VP gas diffusion material layer. A trigger condition is created when one or more of the parameters, indicating the state of local areas of the MEA, cross a threshold value. Some of the parameters that are appropriate trigger initiators are temperature, pH, hydrogen concentration, electrolyte water content, electrolyte thickness, electrolyte ionic conductivity and electrolyte electronic conductivity at local areas of the MEA.

In the preferred embodiment, the reaction rate reduction that minimizes hot spot formation is realized by using a gas diffusion layer made of a polymeric material that varies its porosity as a function of temperature. The pores in these materials grow or shrink in size as temperature in the local area of the GDL decreases or increases. When temperature at a local area of the fuel cell active surface increases above a threshold, the porosity of the variable porosity GDL adjacent to the active surface decreases over this local area, thus reducing the amount of reactant supplied to the active surface of the MEA. The reduced reactant supply to hot active surfaces of the MEA results in a reduced reaction rate which in turn decreases the temperature at local areas of the MEA. A drop in temperature at these local areas open ups the pores of the GDL back to their normal size. This regulation of reactant flow is fully reversible, completely passive and self-regulating. The threshold level, and rate and extent of pore expansion or contraction can be custom tailored to each combination of reactants by appropriate selection of VP polymer materials. The VP layer is micro or nano porous allowing the reactant gas to pass through it. The VP layer can be disposed on the anode side, the cathode side or both sides of the fuel cell MEA.

Although a VP GDL material that varies its porosity as a function of temperature is described in the preferred embodiment, VP GDL materials that are responsive to other parameters, that are indicative of the hot spot initiation condition, such as high localized hydrogen concentration, pH value, electrolyte ionic conductivity, electrolyte electronic conductivity and electrolyte water content can be used to realize the system without deviating from the structure and scope of the present invention.

Typical GDL materials used in fuel cells have an open pore structure and are specifically designed to effectively transport reactants to the fuel cell active area and exhibit high electrical conductivity. These GDL materials are made electrically conductive by embedding highly conductive materials in a mesh matrix made of woven cloth, non-woven paper or felt. The VP GDL material used in embodiments of the present invention can be realized in a number of ways. For example, metal fibers exhibiting positive coefficient of thermal expansion can be used. In the preferred embodiment, the VP GDL is composed of a core layer made of fibrous materials exhibiting positive coefficient of thermal expansion (PCTE), distributed in an ordered or random fashion to create a membrane that is micro or nano porous. In most fuel cell configurations, the GDL has to be electrically conductive to transfer electrons form the active surface to the current collector layer. If the core layer is made of a conductive PCTE material, such as carbon fiber, which has adequate electrical conductivity, no additional treatment of the core layer is needed. In cases where the core layer is made of a material having poor electrical conductivity, a conductive material such as carbon black or silver is either distributed over or embedded in the core layer such that the resulting membrane exhibits high electrical conductivity.

In the preferred embodiment, the VP GDL material is disposed in the fuel cell such that it is in thermal contact with the active surfaces of the MEA where reactants dissociate in the presence of catalysts. When temperature at a local area of the fuel cell active surface increases above a threshold, the PCTE fibrous materials of the core layer in the local area expand in size and move closer to each other thus reducing the size of pores between them. This decrease in porosity reduces the amount of reactant supplied to the active surface of MEA, which results in a reduced reaction rate which in turn decreases the temperature at local areas of the MEA. A drop in temperature at these local areas causes the fibrous PCTE material of the core layer in the local area to contract back to their normal size thus brining the pores back to their normal size.

An additional class of materials that is also well suited for use as VP GDL in a fuel cell according to the present invention are thermoresponsive polymers that exhibit positive swelling behavior with increase in temperature. One such material is described in the paper "Synthesis and Swelling Characteristics of pH and Thermoresponsive Interpenetrating Polymer Network Hydro gel Composed of Poly (vinyl alcohol) and Poly(acrylic acid), authored by Young Moo Lee, et al. (Journal of Applied Polymer Science 1996, Vol. 62, 301–311). In addition to the thermoresponsive materials exhibiting positive swelling, thermoresponsive polymers with negative swelling can also be used in accordance with this invention. When using materials with negative swelling behavior, the boundary condition of the material layer should be such as to allow the pores to shrink with an increase in temperature. A combination of materials exhibiting positive and negative swelling can also be used to realize the desired variable porosity behavior of the GDL. Additional materials that exhibit the required variable porosity behavior are described in "Separation of Organic Substances with Thermoresponsive Polymer Hydrogel" by Hisao Ichijo, et al. (Polymer Gels and Networks 2, 1994, 315–322 Elsevier Science Limited), and "Novel Thin Film with Cylindrical Nanopores That Open and Close Depending on Temperature: First Successful Synthesis", authored by Masaru Yoshida, et.al. (Macromolecules 1996, 29, 8987–8989). The core layer of the VP GDL is formed by disposing the thermoresponsive in gel form using conventional gel coating techniques, by embedding them in a mesh of other PCTE material or by randomly distributing fibrous form of the thermoresponsive material. A conductive material such as carbon black or silver is either distributed over or embedded in the core layer such that the resulting membrane is either micro or nano porous and exhibits high electrical conductivity.

FIG. 1 shows a schematic view of one embodiment of the present invention. The system consists of a single fuel cell unit 100 having a membrane electrode assembly 110 having two opposing major sides. The membrane electrode assembly comprises an electrolyte 120 disposed between and in intimate contact with an anode 130 and a cathode 140. The contact surface between the electrolyte 120, and the electrodes 130, and 140 are coated with noble metal catalysts such as platinum black. A layer of micro or nano porous variable porosity GDL material 150 is disposed on either side of the MEA and in intimate contact with the opposing major surfaces of the MEA. Further, a current collector layer 160 is disposed on the VP GDL layer that is opposite to the one in contact with the MEA layer. During fuel cell operation, the hydrogen molecule dissociates at the electrolyte/catalyst interface into hydrogen ions, $H^+$, and electrons, $e^-$. The hydrogen ions migrate from the anode side to the cathode side through the electrolyte, and the electrons flow around the external electrical load to the cathode side. The electrons generated at the electrolyte/catalyst interface migrate through the anode and the VP GDL layers and are gathered together by the current collector and channeled to an electrical terminal connected to the external electrical load.

While the fuel cell operates, many different conditions such as poor distribution of fuel gases, high concentration of fuel gas at localized areas, runaway reaction at some areas of the MEA, localized dehydration of the electrolyte, and localized shorting of the cell can cause hot spots. A hot spot caused by any of the conditions manifests itself as rapid, localized heating of the MEA. In an embodiment of the present invention, when any part of the MEA begins to heat up creating a potential condition for hot spot development, the area of VP GDL material adjacent to the MEA starts to heat up. At this condition, the porosity of the VP GDL layer at areas where the temperature is over the threshold limit will be very low. This significantly reduces the quantity of reactant gas flowing through that area virtually shutting off reaction in those local areas. This greatly reduced reaction rate adjacent to the shut-off VP GDL areas ultimately halts the formation of hot spots and decreases local surface temperature. Once the temperature drops below the threshold limit, the porosity returns to its normal value and the reaction progresses as before. This regulation of reactant flow to localized areas of the MEA is fully reversible, completely passive and self-regulating.

Although the first embodiment describes a system that has variable porosity material disposed on both sides of the MEA, an alternate embodiment can be realized by disposing the VP GDL material only on the anode or the cathode side of the MEA. Since the diffusion rate of oxygen/air on the cathode side of a hydrogen fuel cell is significantly less than that of hydrogen on the anode side in a hydrogen fuel cell, it is more effective to dispose the VP GDL material on the cathode side of the MEA.

Figure 2:
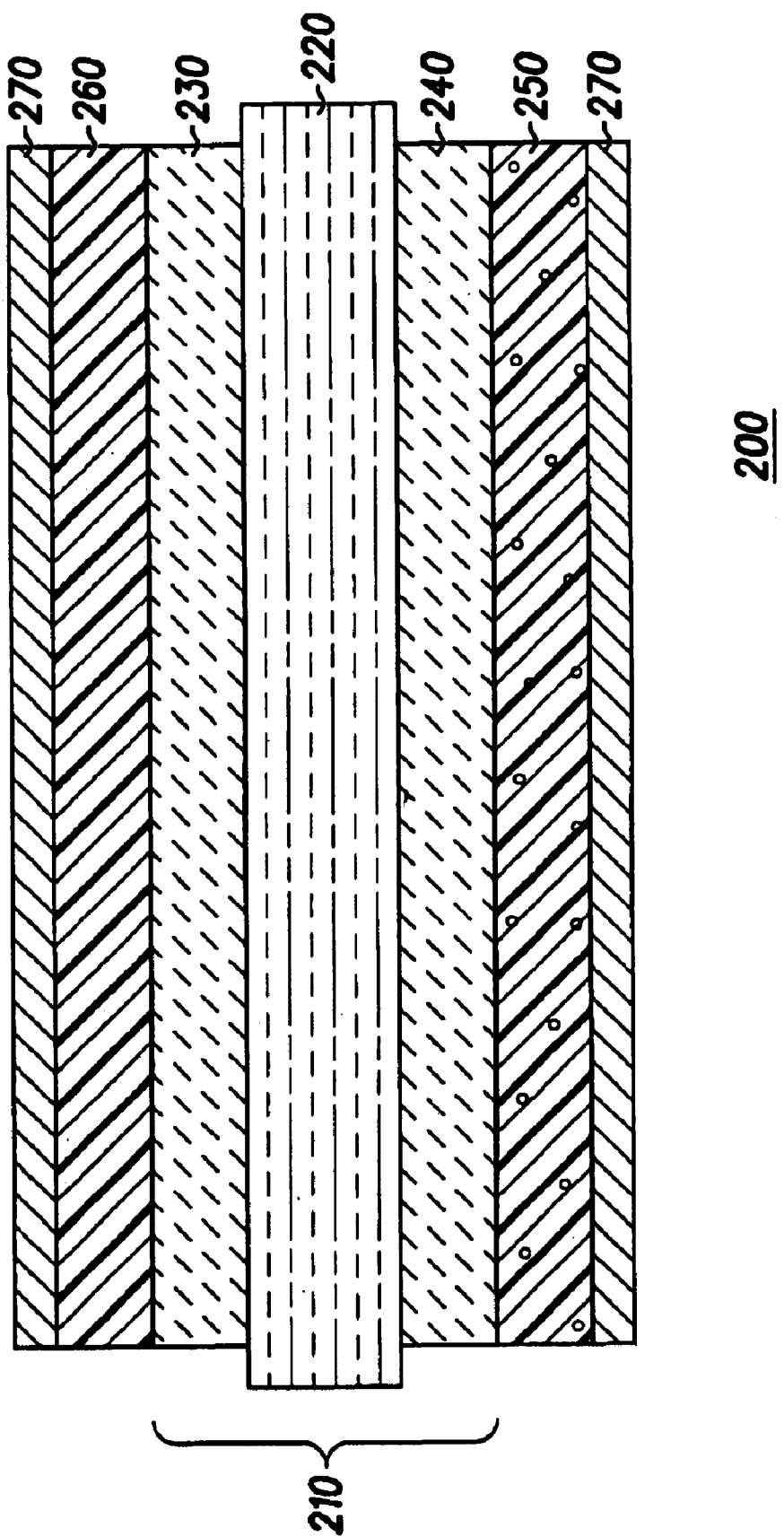
FIG. 2 is a schematic representation of a fuel cell according to a second embodiment of the present invention.

A second embodiment of the present invention that addresses this aspect is schematically shown in FIG. 2. The system consists of a single fuel cell unit 200 having a membrane electrode assembly 210 having two opposing major sides. The membrane electrode assembly comprises an electrolyte 220 disposed between and in intimate contact with an anode 230 and a cathode 240. The contact surface between the electrolyte 220, and the electrodes 230, and 240 are coated with noble metal catalysts such as platinum black. A layer of micro or nano porous variable porosity GDL material 250 is disposed on the cathode side of the MEA and in intimate contact with the cathode surface of the MEA. A layer of conventional GDL material 260 is disposed on the anode side of the MEA and in intimate contact with the anode surface of the MEA. Further, a current collector layer 270 is disposed on both the conventional and the VP GDL layers. When any part of the MEA 210 begins to heat up beyond a threshold value, the area of VP GDL material adjacent to the cathode side of the MEA starts to heat up. At this condition, the porosity of the VP GDL layer at areas where the temperature is over the threshold limit will be very low. This significantly reduces the quantity of oxidant flowing through that area virtually shutting off reaction in those local areas. This greatly reduced reaction rate adjacent to the shut-off VP GDL areas ultimately halts the formation of hot spots and decreases local surface temperature. Once the temperature drops below the threshold limit, the porosity returns to its normal value and the reaction progresses as before.

Figure 3:
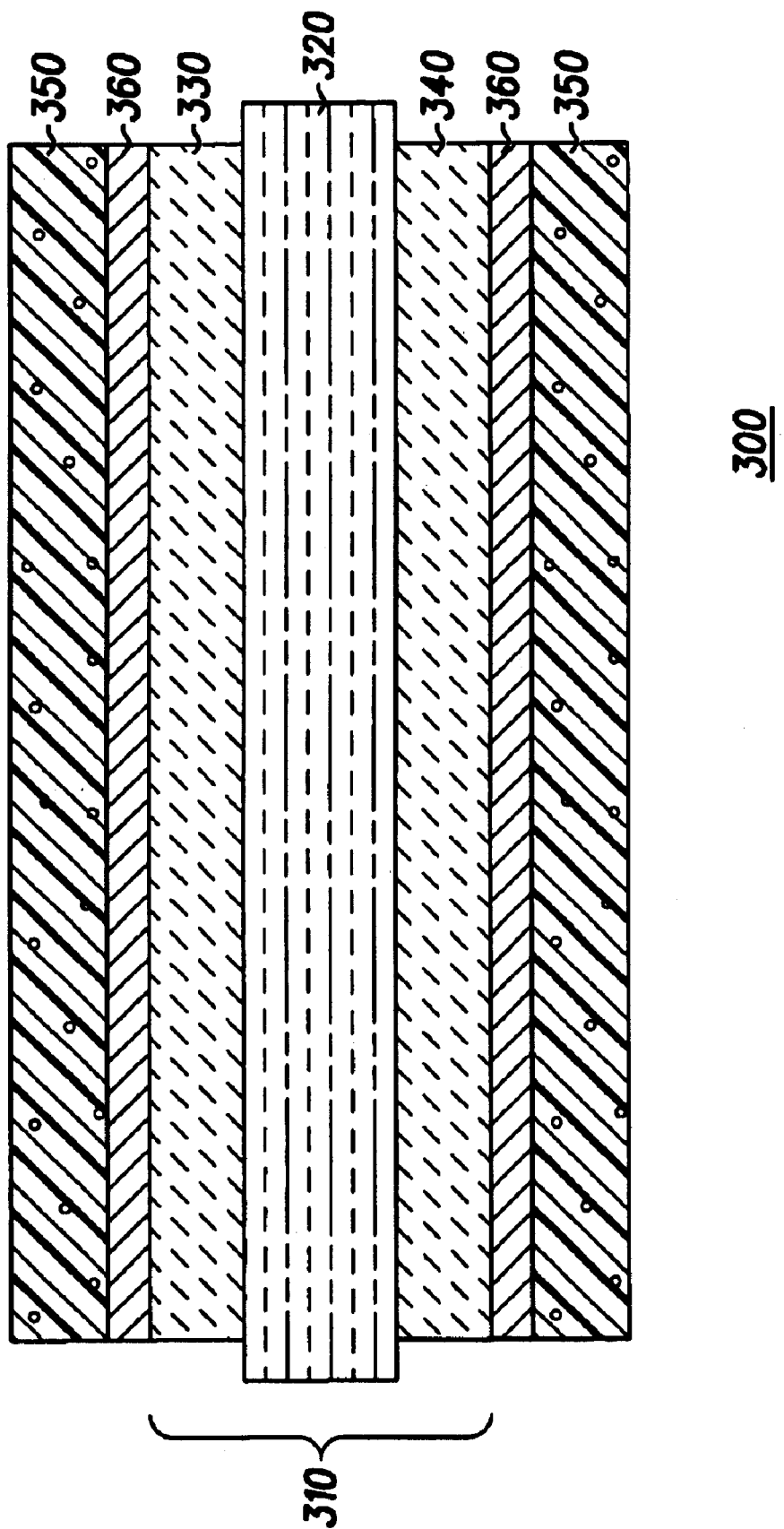
FIG. 3 is a schematic representation of a fuel cell according to a third embodiment of the present invention.

FIG. 3 shows a schematic view of yet another embodiment of the present invention. In this embodiment, the current collector layers are disposed adjacent to and in contact with the two major sides of the MEA and the VP gas diffusion layer material is disposed on top of the current collector layer. The system consists of a single fuel cell unit 300 having a membrane electrode assembly 310 having two opposing major sides. The membrane electrode assembly comprises an electrolyte 320 disposed between and in intimate contact with an anode 330 and a cathode 340. The contact surface between the electrolyte 320, and the electrodes 330, and 340 are coated with noble metal catalysts such as platinum black. A current collector layer 360 is disposed on either side of the MEA and in intimate contact with the opposing major surfaces of the MEA. Further, a layer of micro or nano porous variable porosity GDL material 350 is disposed on the surface of the current collector layer 360 that is opposite to the one in contact with the MEA layer. In this embodiment, as the current collector layer is adjacent to the MEA, the electrical conductivity of the VP gas diffusion material does not affect the net electrical impedance of the fuel cell. Since this embodiment does not require the VP GDL layer to be electrically conductive, it provides more flexibility in the choice of PCTE material and processing options.

A novel fuel cell design that passively regulates the flow of reactant gases and hence the reaction rate at different areas of active surface of a fuel cell based on the localized MEA surface condition is disclosed. For example, by interposing a micro or nano porous variable porosity GDL material between one or more layers of the fuel cell membranes, and by properly selecting VP GDL materials with appropriate porosity change for a given application, significant reduction in hot spot failures can be realized. The novel configuration also maintains the regulation latched until the temperature drops below a threshold, so that "hot spots" are eliminated from the active surface. This approach of using an inherent property of VP GDL materials results in a system that passively controls creation and growth of hot spots in a fuel cell while overcoming the disadvantages of the prior art methods and devices of this general type.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A fuel cell comprising:
   a membrane electrode assembly, comprising an electrolyte disposed between and in intimate contact with an anode forming a first major side of the membrane electrode assembly and a cathode forming a second major side of the membrane electrode assembly; and
   a layer of electrically conductive variable porosity gas diffusion material disposed on and in intimate contact with at least one of the major sides of the membrane electrode assembly,
   wherein porosity of the variable porosity gas diffusion material at localized areas on the variable porosity gas diffusion layer correlates to a temperature differential from a threshold value at corresponding areas on the membrane electrode assembly side in contact with the variable porosity gas diffusion layer,
   wherein the porosity of the variable porosity gas diffusion material decreases in response to a decrease in temperature at corresponding areas on the membrane electrode assembly side in contact with the variable porosity gas diffusion layer, below a threshold value, and
   wherein the variable porosity gas diffusion material further comprises a layer made of electrically conductive materials distributed such that the resulting layer is micro or nano porous.

2. The fuel cell as described in claim 1, wherein the layer material is a combination of one or more elements selected from the group consisting of metal fibers exhibiting positive coefficient of thermal expansion, polymer fibers exhibiting positive coefficient of thermal expansion, thermoresponsive polymers exhibiting positive swelling in gel form, thermoresponsive polymers exhibiting positive swelling in fibrous form, thermoresponsive polymers exhibiting negative swelling in gel form and thermoresponsive polymers exhibiting negative swelling in fibrous form.

3. A fuel cell comprising:
   a membrane electrode assembly, comprising an electrolyte disposed between and in intimate contact with an anode forming a first major side of the membrane electrode assembly and a cathode forming a second major side of the membrane electrode assembly; and
   a layer of electrically conductive variable porosity gas diffusion material disposed on and in intimate contact with at least one of the major sides of the membrane electrode assembly,
   wherein porosity of the variable porosity gas diffusion material at localized areas on the variable porosity gas diffusion layer correlates to a temperature differential from a threshold value at corresponding areas on the membrane electrode assembly side in contact with the variable porosity gas diffusion layer, and
   further wherein the porosity of the variable porosity gas diffusion material decreases in response to a decrease in temperature at corresponding areas on the membrane electrode assembly side in contact with the variable porosity gas diffusion layer, below a threshold value,
   wherein the variable porosity gas diffusion material further comprises:
      a core layer made of materials distributed such that the resulting layer is micro or nano porous; and
      a conductive material disposed over or embedded in the core layer such that the resulting layer is electrically conductive.

4. The fuel cell as described in claim 3, wherein the core layer material is a combination of one or more elements selected from the group consisting of metal fibers exhibiting positive coefficient of thermal expansion, polymer fibers exhibiting positive coefficient of thermal expansion, thermoresponsive polymers exhibiting positive swelling in gel form, thermoresponsive polymers exhibiting positive swelling in fibrous form, thermoresponsive polymers exhibiting negative swelling in gel form and thermoresponsive polymers exhibiting negative swelling in fibrous form.

5. A fuel cell comprising:
   a membrane electrode assembly, comprising an electrolyte disposed between and in intimate contact with an anode forming a first major side of the membrane electrode assembly and a cathode forming a second major side of the membrane electrode assembly;
   a layer of electrically conductive variable porosity gas diffusion material disposed on and in intimate contact with at least one of the major sides of the membrane electrode assembly; and
   a current collector layer disposed on at least one side of the membrane electrode assembly, such that the electrically conductive variable porosity gas diffusion layer is positioned in between and in intimate contact with the current collector layer and the membrane electrode assembly,
   wherein porosity of the variable porosity gas diffusion material at localized areas on the variable porosity gas diffusion layer correlates to a temperature differential from a threshold value at corresponding areas on the membrane electrode assembly side in contact with the variable porosity gas diffusion layer, and
   further wherein the porosity of the variable porosity gas diffusion material decreases in response to a decrease in temperature at corresponding areas on the membrane electrode assembly side in contact with the variable porosity gas diffusion layer, below a threshold value.

* * * * *